(12) United States Patent
Tatsumi et al.

(10) Patent No.: US 11,914,871 B2
(45) Date of Patent: Feb. 27, 2024

(54) ELECTRONIC CONTROL DEVICE AND PROGRAM-UPDATE METHOD

(71) Applicant: Hitachi Astemo, Ltd., Hitachinaka (JP)

(72) Inventors: Motoki Tatsumi, Hitachinaka (JP); Mayumi Maeda, Hitachinaka (JP); Toshihisa Arai, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 281 days.

(21) Appl. No.: 17/421,670

(22) PCT Filed: Jan. 27, 2020

(86) PCT No.: PCT/JP2020/002808
§ 371 (c)(1),
(2) Date: Jul. 8, 2021

(87) PCT Pub. No.: WO2020/158675
PCT Pub. Date: Aug. 6, 2020

(65) Prior Publication Data
US 2022/0091762 A1 Mar. 24, 2022

(30) Foreign Application Priority Data
Jan. 28, 2019 (JP) .................. 2019-011939

(51) Int. Cl.
*G06F 3/06* (2006.01)
(52) U.S. Cl.
CPC .......... *G06F 3/0631* (2013.01); *G06F 3/0604* (2013.01); *G06F 3/0634* (2013.01); *G06F 3/0659* (2013.01); *G06F 3/0679* (2013.01)
(58) Field of Classification Search
CPC .... G06F 3/0631; G06F 3/0604; G06F 3/0634; G06F 3/0659; G06F 3/0679
See application file for complete search history.

(56) References Cited

U.S. PATENT DOCUMENTS

| 6,601,212 B1 * | 7/2003 | Guha ................. G06F 11/1433 |
| | | 714/766 |
| 2004/0153724 A1 * | 8/2004 | Nicholson ........... G06F 11/0709 |
| | | 714/E11.133 |

(Continued)

FOREIGN PATENT DOCUMENTS

| JP | 5-197629 A | 8/1993 |
| JP | 6-274320 A | 9/1994 |

(Continued)

OTHER PUBLICATIONS

International Search Report (PCT/ISA/210) issued in PCT Application No. PCT/JP2020/002808 dated Apr. 14, 2020 with English translation (seven (7) pages).

(Continued)

*Primary Examiner* — Edward J Dudek, Jr.
(74) *Attorney, Agent, or Firm* — Crowell & Moring LLP

(57) ABSTRACT

An electronic control device includes a nonvolatile memory having allocated two storage areas that are exclusively switchable between an active state and an inactive state, the two storage areas being set such that in a state in which a program is written in the storage area in the active state, a program is written for updating to the storage area in the inactive state in response to an instruction from an external device, followed by switching the storage area in the active state to the inactive state and switching the storage area in the inactive state to the active state. In the electronic control device, when the program written in the storage area in the active state differs from the program written in the storage area in the inactive state, the program written in the storage area switched to the active state is copied to the storage area in the inactive state.

16 Claims, 12 Drawing Sheets

(56) References Cited

U.S. PATENT DOCUMENTS

| | | | |
|---|---|---|---|
| 2006/0041738 A1* | 2/2006 | Lai | G06F 11/1417 |
| | | | 714/E11.133 |
| 2007/0100513 A1 | 5/2007 | Asano | |
| 2011/0087920 A1* | 4/2011 | Hendricks | H04L 9/3247 |
| | | | 714/21 |
| 2018/0267793 A1* | 9/2018 | Watanabe | G06F 3/0659 |

FOREIGN PATENT DOCUMENTS

| | | |
|---|---|---|
| JP | 2002-333990 A | 11/2002 |
| JP | 2003-140915 A | 5/2003 |
| JP | 2006-301960 A | 11/2006 |
| JP | 2009-44543 A | 2/2009 |
| JP | 2011-85977 A | 4/2011 |
| JP | 2018-86894 A | 6/2018 |
| WO | WO 2005/059862 A1 | 6/2005 |

OTHER PUBLICATIONS

Japanese-language Written Opinion (PCT/ISA/237) issued in PCT Application No. PCT/JP2020/002808 dated Apr. 14, 2020 (four (4) pages).
Sorimachi, T., Journal of Denso Technical Disclosure, ISSN 1342-7970, Jul. 15, 2003, No. 140, p. 2 with English translation (nine (9) pages).
International Preliminary Report on Patentability (PCT/IB/338 & PCT/IB/373) issued in PCT Application No. PCT/JP2020/002808 dated Aug. 12, 2021, including English translation of document C2 (Japanese-language Written Opinion (PCT/ISA/237), filed on Jul. 8, 2021) (11 pages).
Extended European Search Report issued in European Application No. 20749462.6 dated Oct. 13, 2022 (eight (8) pages).

* cited by examiner

ELECTRONIC CONTROL DEVICE AND PROGRAM-UPDATE METHOD

TECHNICAL FIELD

The present invention relates to an electronic control device and to a program-update method.

BACKGROUND ART

Electronic control devices mounted on automobiles or other vehicles sometimes have to update their programs for adding new functions or fixing bugs, for example. Conventionally, vehicle users take their vehicles to a car dealership, for example, for updating such program of the electronic control device. Since it is inconvenient for them, as disclosed in JP 2018-86894 A (Patent Document 1), proposed is a technique in which the program is automatically updated at the user site by the "over the air (OTA)" technique using wireless communication.

REFERENCE DOCUMENT LIST

Patent Document

Patent Document 1: JP 2018-86894 A

SUMMARY OF THE INVENTION

Problem to be Solved by the Invention

Upon updating the program by OTA, it is desired to successfully update the program even when the vehicle is running, for example. For this purpose, two storage areas may be allocated in a nonvolatile memory of the electronic control device and they can be alternately used. Specifically, one storage area is used to store a program to be executed, and the other storage area is used as a reserved area for updating the program. An update program is written in the reserved area. Then, the program to be executed is switched to the updated one when the electronic control device reboots, for example. In this way, the program can be updated even when the vehicle is running, for example.

In the above case, if any failure occurs in the update program, the updated program can be switched to the original, to thereby allow continuous control on a target component. However, the programs stored in the two storage areas are different. Thus, if the updated program is switched to the original, the vehicle driver or others may feel discomfort.

It is accordingly an object of the present invention to provide an electronic control device and a program-update method, which cause less discomfort at the time of switching programs.

Means for Solving the Problem

The present invention provides an electronic control device including a nonvolatile memory having allocated two storage areas that are exclusively switchable between an active state and an inactive state, the two storage areas being set such that in a state in which a program is written in the storage area in the active state, a program is written for updating in the storage area in the inactive state in response to an instruction from an external device, followed by switching the storage area in the active state to the inactive state and switching the storage area in the inactive state to the active state. In the electronic control device, when the program written in the storage area in the active state differs from the program written in the storage area in the inactive state, the program written in the storage area switched to the active state is copied to the storage area in the inactive state.

Effects of the Invention

According to the present invention, the program written in the storage area in the active state matches the program written in the storage area in the inactive state, thereby causing less discomfort at the time of switching the programs.

MODE FOR CARRYING OUT THE INVENTION

Referring to the accompanying drawings, embodiments of the present invention will be described in detail below.

Figure 1:
FIG. 1 is a system diagram illustrating how to update a program of an electronic control device.

FIG. 1 illustrates an example of a system for updating a program of an electronic control device mounted on a vehicle VH by OTA. An update program is delivered to vehicle VH through wireless communication from a base station BS connected to a data center called "OTA center" (not illustrated). The update program thus delivered to vehicle VH is sent to the electronic control device via a wireless transceiver, a gateway, and an in-vehicle network of vehicle VH and written in a nonvolatile memory thereof. Here, base station BS is an example of an external device.

Figure 2:
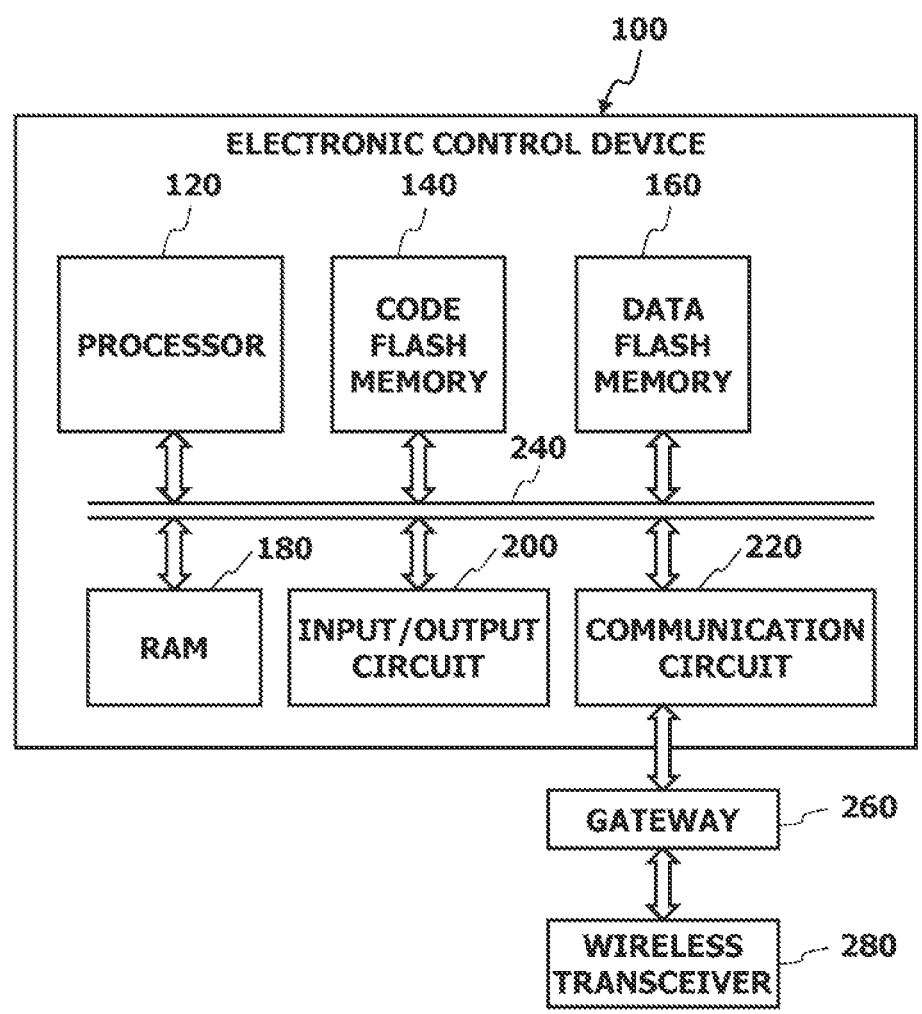
FIG. 2 is an internal configuration diagram illustrating an example of the electronic control device.

FIG. 2 illustrates an example of an electronic control device 100 mounted on vehicle VH.

Electronic control device 100 includes a processor 120, a code flash memory 140, a data flash memory 160, a random access memory (RAM) 180, an input/output circuit 200, a communication circuit 220, and an internal bus 240 for connecting these components in a mutually communicable manner. Here, code flash memory 140 is an example of a nonvolatile memory. FIG. 2 illustrates only one electronic control device 100, but vehicle VH may have a plurality of electronic control devices 100 connected to a controller area network (CAN) or other in-vehicle network.

Processor 120 is hardware for executing an instruction set (e.g., data transfer, computation, processing, control, and management) described in a program. The processor includes a computing unit, a register for storing instructions and information, and a peripheral circuit, for example. Code flash memory 140 includes an electrically rewritable nonvolatile memory, and stores programs for controlling the engine, an automatic transmission, and a fuel injector, for example. Data flash memory 160 includes an electrically rewritable nonvolatile memory. The data flash memory 160 stores learning values or other data, for example. RAM 180 includes a volatile memory in which data is erased when the power supply is interrupted. The RAM 180 provides a temporal storage area for processor 120.

Input/output circuit 200 includes, for example, an A/D converter, a D/A converter, and a D/D converter, and provides a function of inputting and outputting an analog signal and a digital signal to and from an external device. Communication circuit 220 includes a CAN transceiver, for example, and provides a function of connecting to the in-vehicle network. Internal bus 240 is a path for exchanging data between devices. The internal bus 240 includes an address bus for transferring an address, a data bus for transferring data, and a control bus for exchanging information about the actual timing to input or output data through the address bus or data bus, and control information therefor.

Communication circuit 220 of electronic control device 100 is connected to a wireless transceiver 280 that communicates wirelessly with base station BS through a gateway 260. In this example, gateway 260 provides a function of converting the protocol of data transmitted from base station BS into the protocol that can be processed by communication circuit 220, and also a function of converting the protocol of data processed in electronic control device 100 into the protocol that can be processed by base station BS.

With the above configuration, wireless transceiver 280 mounted on vehicle VH receives the update program delivered from base station BS, and then, the update program is converted in protocol by gateway 260 and transmitted to processor 120 via communication circuit 220 and internal bus 240. After that, processor 120 updates a program of code flash memory 140 according to a rewrite program prestored in code flash memory 140, for example, as detailed below. Here, the rewrite program prestored in code flash memory 140 can be also updated.

Figure 3:
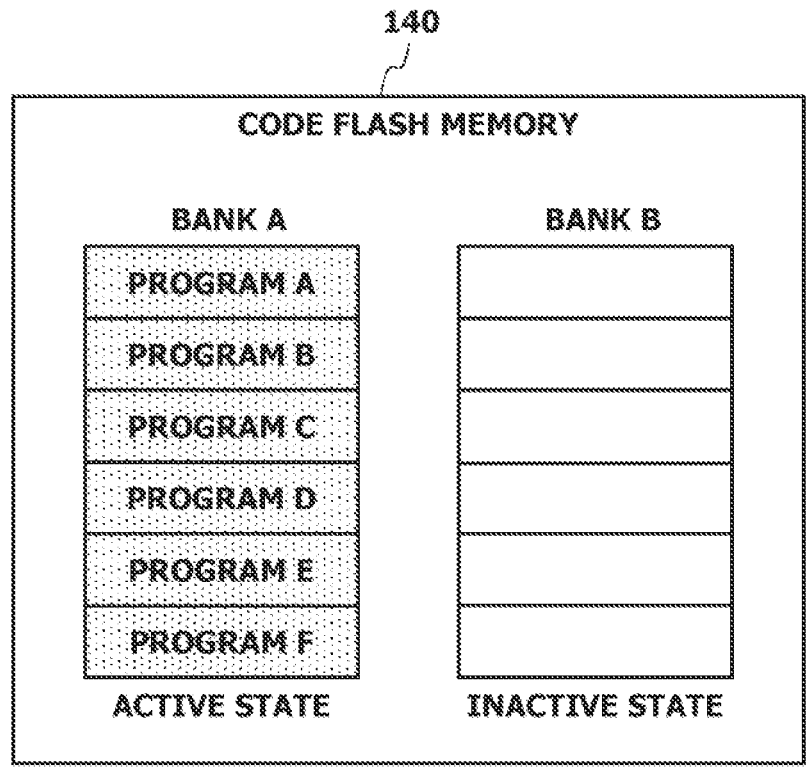
FIG. 3 illustrates the data structure of a code flash memory.

As illustrated in FIG. 3, a bank A and a bank B are allocated in code flash memory 140 as an example of two storage areas that are exclusively switchable between an active state and an inactive state for each program to be written therein. In the illustrated example, programs A to F for controlling target components of electronic control device 100 are written in the bank A in an active state, and no data is written in the bank B in an inactive state. In this example, the bank B in the inactive state is used as a reserved area for updating the programs A to F. The bank in the active state and the bank in the inactive state will be hereinafter referred to as "active ROM" and "inactive ROM", respectively.

Now, problems of the conventional technique are described.

Figure 4:
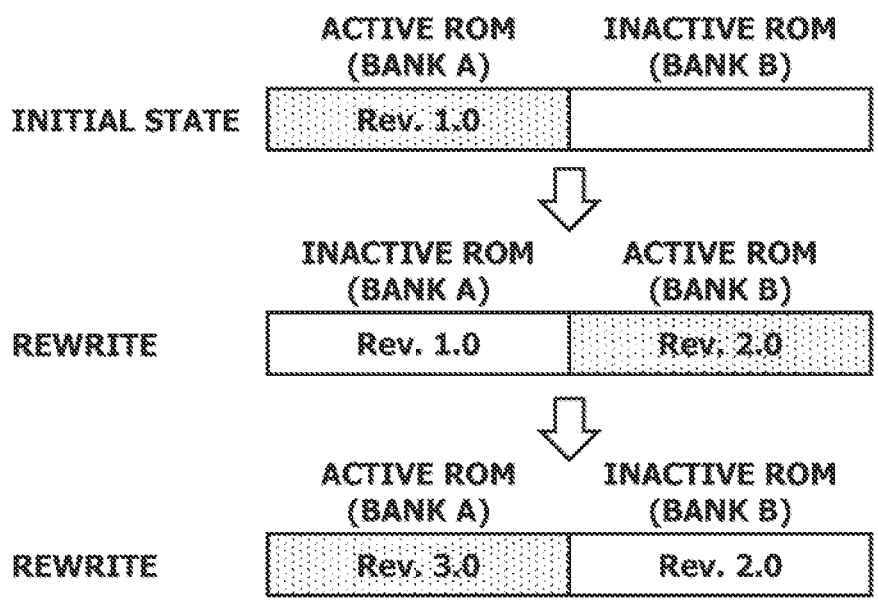
FIG. 4 is an exemplary diagram on how to update a program with a conventional technique.

In an initial state of electronic control device 100, as illustrated in FIG. 4, a program of Rev. 1.0 is written in the active ROM, and the inactive ROM is unused. In this initial state, when updating the program written in the active ROM, a program of Rev. 2.0 is written in the inactive ROM. Then, the active ROM is switched to the inactive ROM and also the inactive ROM is switched to the active ROM at a predetermined timing, for example, at reboot time of electronic control device 100. Accordingly, electronic control device 100 can execute afterward the program of Rev. 2.0 written in the active ROM, thereby performing such control that a function is added or a bug is fixed, for example.

When further updating the program of Rev. 2.0 written in the active ROM, a program of Rev. 3.0 is written in the inactive ROM, and the active ROM is switched to the inactive ROM and also the inactive ROM is switched to the active ROM at a predetermined timing. In this way, the program can be updated even when vehicle VH is running.

As apparent from FIG. 4, however, the program written in the active ROM has a different revision from the program written in the inactive ROM. Thus, if any failure occurs in the program written in the active ROM and the active ROM and the inactive ROM are switched, a slight difference in their control may undesirably make the vehicle driver feel discomfort. To address the above, if the program written in the active ROM and the program written in the inactive ROM are different, electronic control device 100 copies the program written in the active ROM to the inactive ROM so that the programs written in the active ROM and the inactive ROM can have the same revision.

Figure 5:
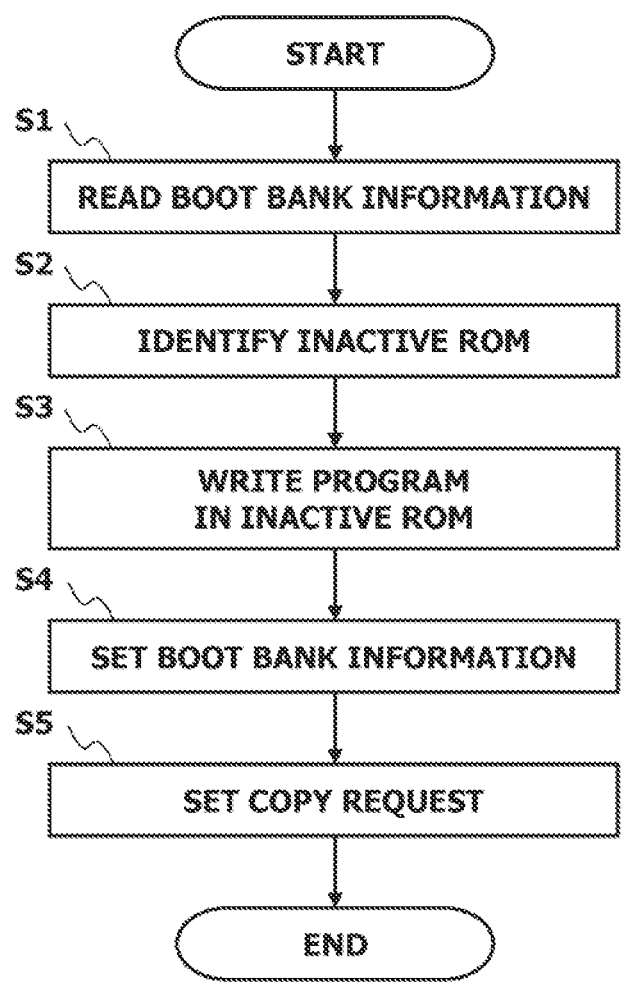
FIG. 5 is a flowchart of an example of program update processing.

FIG. 5 illustrates an example of program update processing which is executed according to a program for update written in code flash memory 140 when processor 120 of electronic control device 100 receives a request to update the program. In this example, in data flash memory 160 of electronic control device 100, an area for storing boot bank information and a copy request is allocated in advance. In the data structure of FIG. 3, the boot bank information is set to "bank A", and the copy request is set to "no request" by default. Here, the area for storing boot bank information and a copy request is not limited to data flash memory 160 and can be allocated in advance in code flash memory 140.

In Step 1 (in FIG. 5, abbreviated as "S1"; the same applies below), processor 120 of electronic control device 100 reads the boot bank information from data flash memory 160. The boot bank information is for identifying an active ROM. In this case, an inactive ROM can be identified as a result of identifying the active ROM.

In Step 2, processor 120 of electronic control device 100 identifies an inactive ROM based on the boot bank information. That is, if the "bank A" is set to the boot bank information, processor 120 of electronic control device 100 identifies the inactive ROM as the "bank B". If the "bank B" is set to the boot bank information, the processor 120 identifies the inactive ROM as the "bank A".

In Step 3, processor 120 of electronic control device 100 receives a program delivered from base station BS and writes it in the inactive ROM. At this time, if the program is large, processor 120 of electronic control device 100 may sequentially receive programs divided into a predetermined size, and write them one after another in the inactive ROM. The program delivered from base station BS may be encrypted using a secret key or compressed based on a predetermined rule. Moreover, the program delivered from base station BS may be a difference of the program written in the active ROM. Processor 120 of electronic control device 100 may use, for example, cyclic redundancy check (CRC) or checksum to determine whether the program has been successfully received and written, and as needed, send a request to retransmit the program.

In Step 4, processor 120 of electronic control device 100 sets the boot bank information so that, through switching the inactive ROM to the active ROM at a predetermined timing, for example, at boot time of electronic control device 100, electronic control device 100 can start control based on the program written in the active ROM. Specifically, when writing the program in the bank A, processor 120 of electronic control device 100 sets the "bank A" to the boot bank information, and when writing the program in the bank B, processor 120 sets the "bank B" to the boot bank information. Here, the predetermined timing to switch the inactive ROM to the active ROM is not limited to the boot time of electronic control device 100 and can be, for example, the timing to stop idling of the engine or reset (the same applies to subsequent processing).

In Step 5, processor 120 of electronic control device 100 sets a copy request to copy the program written in the active ROM to the inactive ROM so that the program written in the active ROM and the program written in the inactive ROM can have the same revision.

According to such program update processing, when receiving a request to update the program, processor 120 of electronic control device 100 writes an update program in the inactive ROM to update the boot bank information and set a copy request. Hence, processor 120 of electronic control device 100 can prepare, in subsequent processing, to control a target component using the latest program and ensure consistency between the programs of the active ROM and the inactive ROM.

Figure 6:
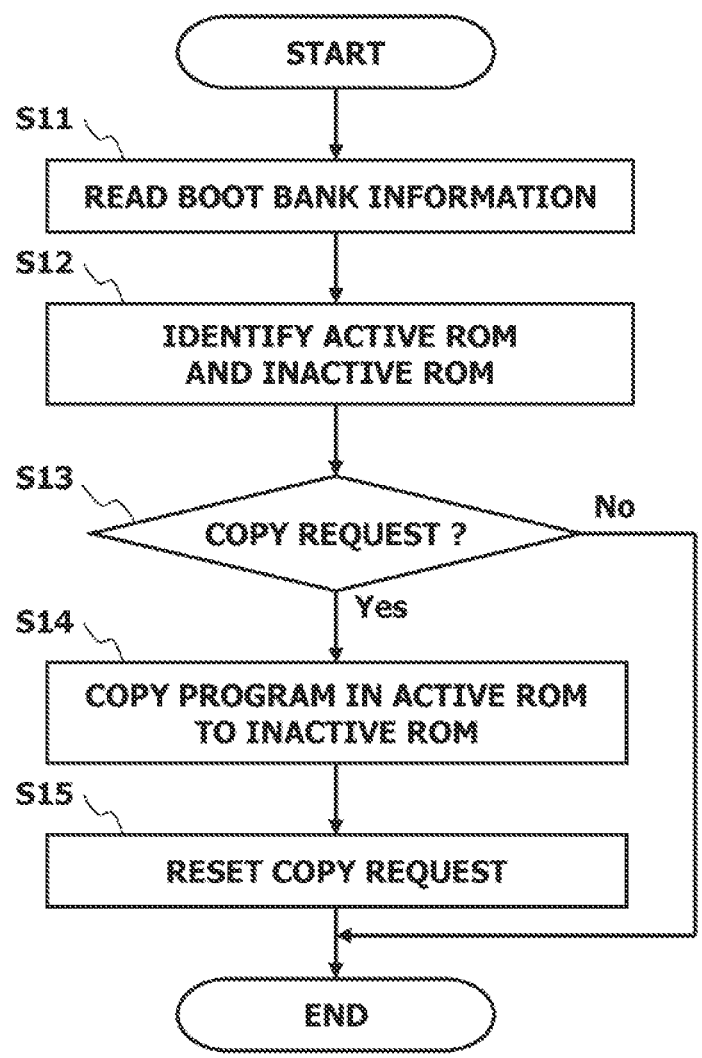
FIG. 6 is a flowchart of an example of first initialization processing.

FIG. 6 illustrates an example of first initialization processing which is executed by processor 120 of electronic control device 100 according to an initialization program written in code flash memory 140 when electronic control device 100 boots up. Following the first initialization processing, processor 120 of electronic control device 100 executes normal control to control the target component such as the engine, the automatic transmission, and the motor.

In Step 11, processor 120 of electronic control device 100 reads the boot bank information from data flash memory 160.

In Step 12, processor 120 of electronic control device 100 identifies the active ROM and the inactive ROM based on the boot bank information. Specifically, if the boot bank information is the "bank A", processor 120 of electronic control device 100 identifies the active ROM as the "bank A" and the inactive ROM as the "bank B". If the boot bank information is the "bank B", processor 120 of electronic control device 100 identifies the active ROM as the "bank B" and identifies the inactive ROM as the "bank A".

In Step 13, processor 120 of electronic control device 100 refers to the copy request in code flash memory 140 to determine whether the copy request is set, that is, whether the copy request is made. Then, if it is determined that the copy request is made (Yes), processor 120 of electronic control device 100 advances the processing to Step 14. If it is determined that the copy request is not made (No), processor 120 of electronic control device 100 ends the first initialization processing and shifts to normal control.

In Step 14, as the copy request has been made, processor 120 of electronic control device 100 copies the program in the active ROM, that is, the update program to the inactive ROM. Consequently, the program in the active ROM can match the program in the inactive ROM.

In Step 15, as the copy request has been responded to, processor 120 of electronic control device 100 resets the copy request, that is, changes the copy request stored in data flash memory 160 to "no request". After that, processor 120 of electronic control device 100 ends the first initialization processing and shifts to the normal control.

Figure 7:
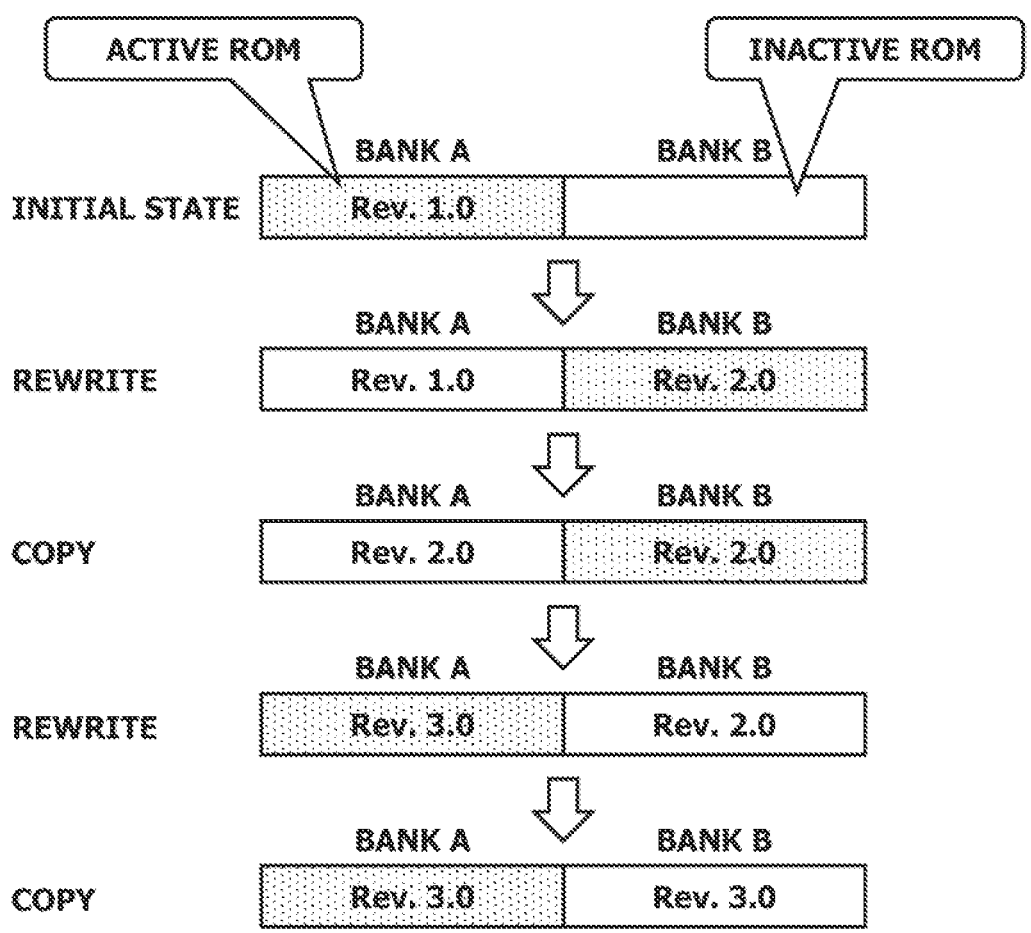
FIG. 7 is an exemplary diagram on how programs in two storage areas can have the same revision.

As illustrated in FIG. 7, according to the above first initialization processing, in the initial state in which the program of Rev. 1.0 is written in the bank A as the active ROM, the program of Rev. 2.0 is written in the bank B as the inactive ROM in response to an update instruction from the external device. After that, when electronic control device 100 boots up, the active ROM is switched to the inactive ROM and also the inactive ROM is switched to the active ROM, to thereby copy the program of Rev. 2.0 written in the bank B as the active ROM to the bank A as the inactive ROM.

In this state, when another update instruction is received from the external device, the program of Rev. 3.0 is written in the bank A as the inactive ROM in response to the update instruction. After that, when electronic control device 100 boots up, the active ROM is switched to the inactive ROM and also the inactive ROM is switched to the active ROM, to thereby copy the program of Rev. 3.0 written in the bank A as the active ROM to the bank B as the inactive ROM.

Accordingly, even when vehicle VH is running, the program can be updated and also the program in the active ROM can match the program in the inactive ROM. Hence, even if the active ROM has a failure and switches to the inactive ROM, the vehicle driver or others feel less discomfort. Moreover, even if the active ROM has a failure, the same control is continued using the program written in the inactive ROM to thereby avoid degeneration operation, for example, a fail safe mode.

Here, the program written in the active ROM may be rewritten due to noise or other factor and consequently lose a required function. To address this, the program in the active ROM is checked at boot time of electronic control device 100 as described below. In this case, if the program has a failure, a program that is possibly normal is copied for repair.

Figure 8:
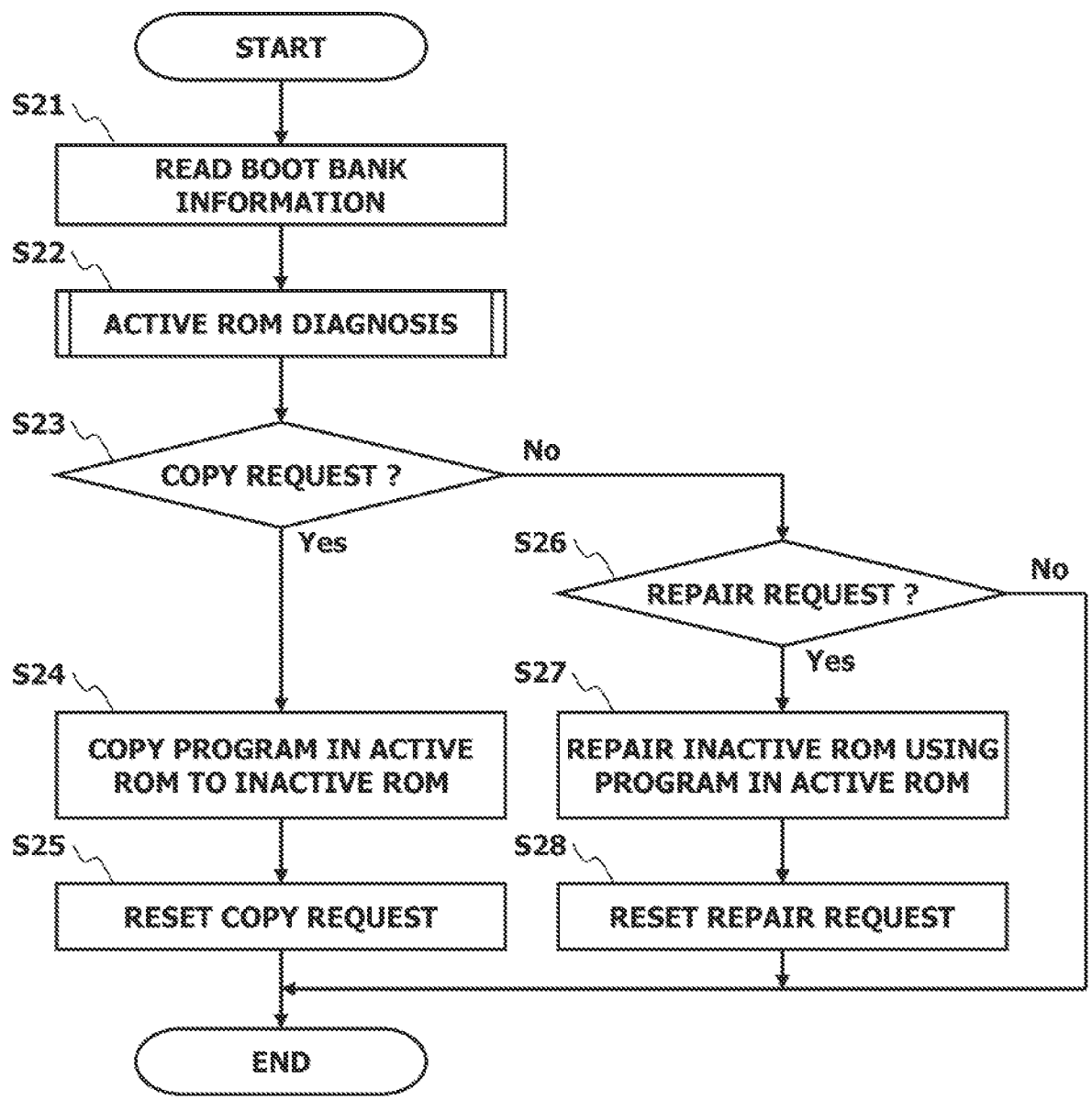
FIG. 8 is a flowchart of an example of second initialization processing.

FIG. 8 illustrates an example of second initialization processing which is executed by processor 120 of electronic control device 100 according to an initialization program written in code flash memory 140 when electronic control device 100 boots up. In this case, in data flash memory 160 of electronic control device 100, an area for storing a repair request as well as the request for storing boot bank information and a copy request are allocated in advance, and the repair request is set to "no request" by default. The area for storing the repair request is not limited to data flash memory 160 and may be allocated in advance in code flash memory 140. Following the second initialization processing, processor 120 of electronic control device 100 executes normal control to control the target component such as the engine, the automatic transmission, and the motor. In view of eliminating duplicate description, the same processing as the first initialization processing is described briefly. If necessary, refer to the description of the first initialization processing.

In Step 21, processor 120 of electronic control device 100 reads boot bank information from data flash memory 160.

In Step 22, processor 120 of electronic control device 100 calls a subroutine for active ROM diagnosis to determine whether a failure occurs in program written in the active ROM identified by the boot bank information. Here, in the active ROM diagnosis, if the active ROM has a failure, the active ROM is switched to the inactive ROM, the inactive ROM is switched to the active ROM, and the repair request is set as detailed below. The active ROM diagnosis is not limited to the subroutine procedure and can be included in the second initialization processing.

In Step 23, processor 120 of electronic control device 100 determines whether the copy request is made. If it is determined that the copy request is made (Yes), processor 120 of electronic control device 100 advances the processing to Step 24. If it is determined that no copy request is made (No), processor 120 of electronic control device 100 advances the processing to Step 26.

In Step 24, as the copy request has been made, processor 120 of electronic control device 100 copies the program in the active ROM to the inactive ROM.

In Step 25, processor 120 of electronic control device 100 resets the copy request. After that, processor 120 of electronic control device 100 ends the second initialization processing and shifts to the normal control.

In Step 26, processor 120 of electronic control device 100 refers to the repair request in code flash memory 140 to determine whether the repair request is set, that is, whether the repair request is made. Then, if it is determined that the repair request is made (Yes), processor 120 of electronic control device 100 advances the processing to Step 27. If it is determined that no repair request is made (No), processor 120 of electronic control device 100 ends the second initialization processing and shifts to the normal control.

In Step 27, as the repair request has been made, processor 120 of electronic control device 100 copies the program in the active ROM, that is, a possibly normal program to the inactive ROM for repair. In this way, the defective program can be repaired, and the program in the active ROM can match the program in the inactive ROM.

In Step 28, as the repair request has been responded to, processor 120 of electronic control device 100 resets the repair request, that is, changes the repair request stored in data flash memory 160 to "no request". After that, processor 120 of electronic control device 100 ends the second initialization processing and shifts to the normal control.

Figure 9:
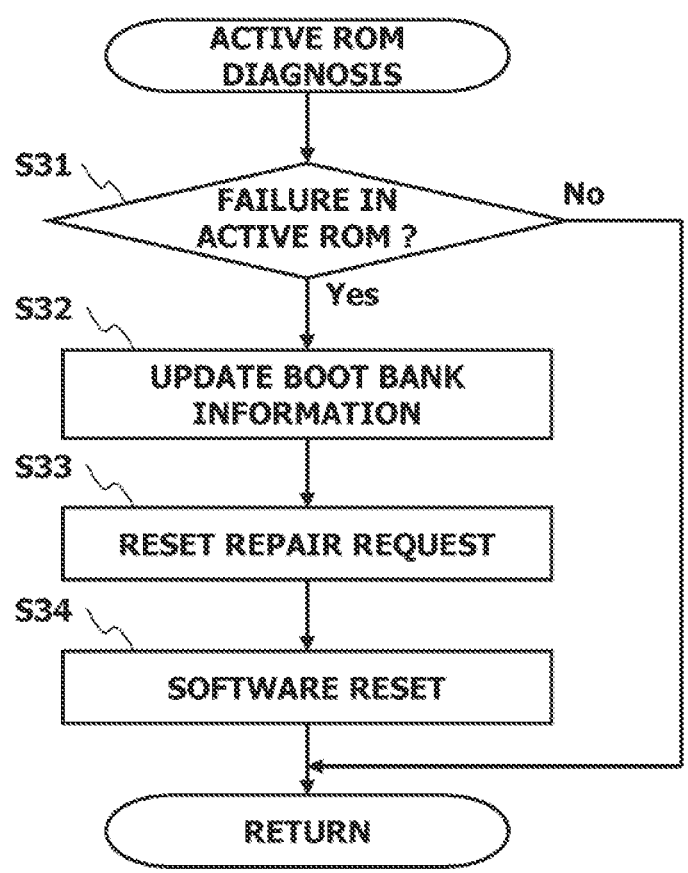
FIG. 9 is a flowchart of an example of active ROM diagnostic processing.

FIG. 9 illustrates an example of active ROM diagnostic processing using the subroutine procedure.

In Step 31, processor 120 of electronic control device 100 determines whether a failure occurs in a program written in an active ROM identified by the boot bank information, using the CRC or checksum, for example. Then, if it is determined that the program written in the active ROM has a failure (Yes), processor 120 of electronic control device 100 advances the processing to Step 32. If it is determined that the program written in the active ROM has no failure, that is, the program is a normal one (No), processor 120 of electronic control device 100 ends the active ROM diagnostic processing and returns to the second initialization processing.

In Step 32, processor 120 of electronic control device 100 updates the boot bank information to the inactive ROM so as to control a target component using a program written in the inactive ROM that is less likely defective. In short, if a failure occurs in the program written in the active ROM, processor 120 of electronic control device 100 updates the boot bank information to switch the active ROM and the inactive ROM and continue control on a control target using the program written in the active ROM in subsequent processing. In this case, considering that the failure can be repaired by copying the program, the boot bank information may not be updated.

In Step 33, processor 120 of electronic control device 100 sets a repair request to overwrite a normal program for repair to a defective program, that is, set "request made" to the repair request.

In Step 34, processor 120 of electronic control device 100 executes software reset so as to perform the second initialization processing from the beginning. If the software reset is done, initialization processing omitted herein is executed again, to thereby avoid unexpected processing. Here, the software reset certainly brings the active ROM diagnostic processing to the end.

According to the above second initialization processing and active ROM diagnostic processing, if a failure occurs in the program written in the active ROM, a program that is possibly normal is overwritten thereto and the failure is repaired, in addition to the action and effect of the first initialization processing. Accordingly, even if a failure occurs in the program written in the active ROM for some reason after updating the program, the program written in the active ROM and the program written in the inactive ROM can have the same revision. In addition, when a failure occurs in the program written in the active ROM, the software reset is executed. Thus, in response to this reset, the active ROM and the inactive ROM are switched, and a target component is continuously controlled using the program written in the active ROM.

Figure 10:
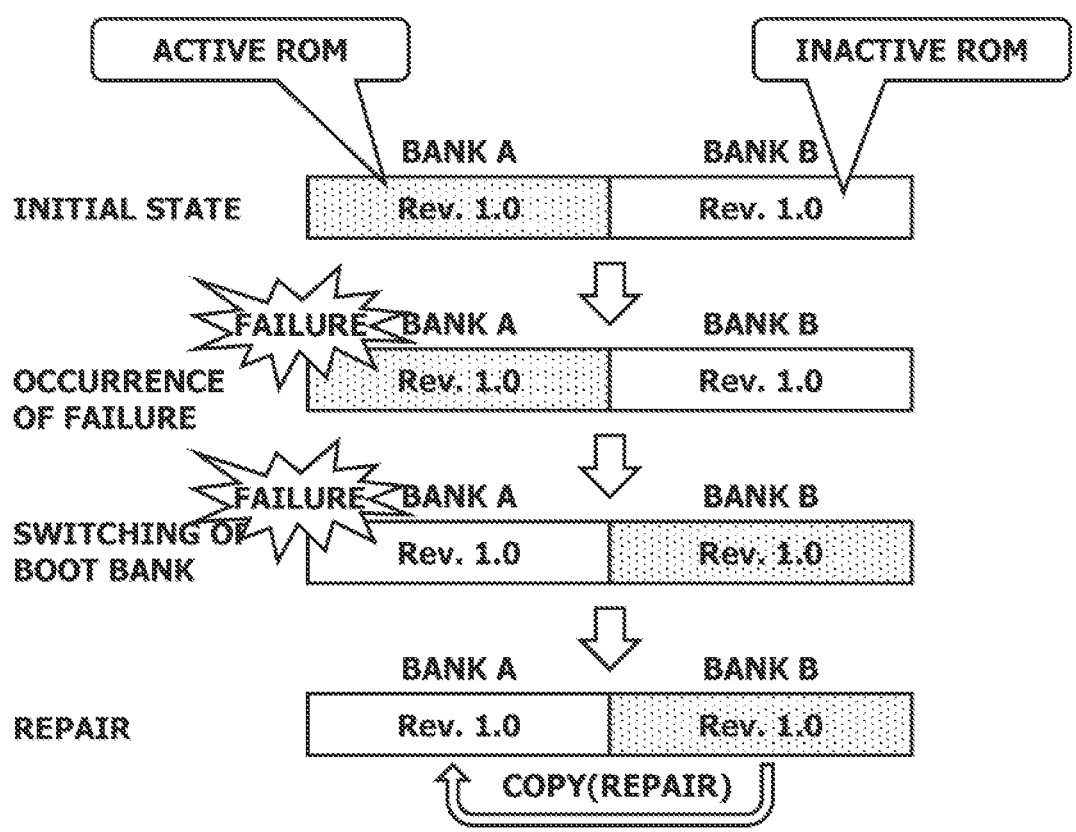
FIG. 10 is an exemplary diagram on how to fix a defective program.

Referring to a specific example of FIG. 10, description is given of how to repair a failure that occurs in the program written in the active ROM. Now, the following case is considered: in the initial state in which the program of Rev. 1.0 is written in the bank A as the active ROM and the bank B as the inactive ROM, a failure occurs in the program stored in the bank A as the active ROM for some reason. In this case, when the occurrence of a failure in the program in the bank A is detected, the boot bank information is switched to the "bank B" and also the repair request is set, followed by execution of the software reset. Then, the second initialization processing is executed from the beginning. In response to the setting of the repair request, a program written in the bank B that is possibly normal is copied to the bank A so that the defective program is overwritten by the normal program for repair.

The inactive ROM allocated in code flash memory 140 is used only for updating the program, with the result that a storage area available on code flash memory 140 is reduced. To address this, if the inactive ROM is unused, failure information or any other data may be written therein in order to efficiently use code flash memory 140.

Figure 11:
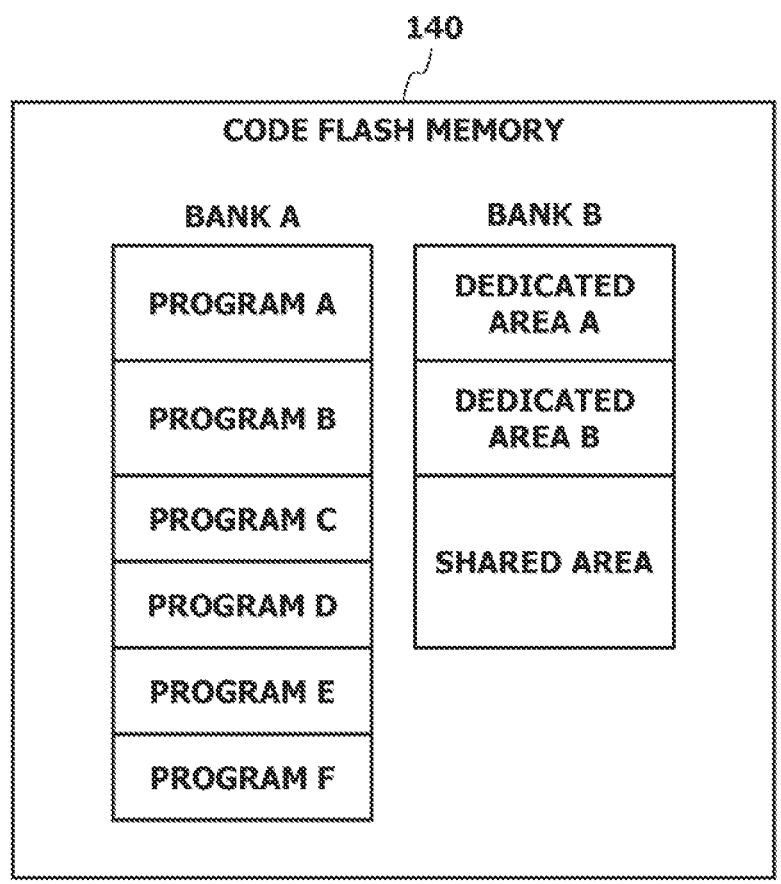
FIG. 11 illustrates another data structure of the code flash memory.

Moreover, as illustrated in FIG. 11, either the bank A or the bank B allocated in code flash memory 140, for example, the bank B may be divided into a dedicated area and a shared area. The dedicated area is for at least one program selected from a plurality of programs based on a predetermined rule. The shared area is to be shared with at least one other program. In the illustrated example, the bank B is divided into a dedicated area A for the program A, a dedicated area B for the program B, and a shared area for programs C to F, but its data structure can be freely set. Moreover, the predetermined rule may be the importance of a program for controlling vehicle VH, for example, the importance in terms of safety. Here, the bank A and the bank B can be exclusively switched, for each program, between the active ROM and the inactive ROM.

Figure 12:
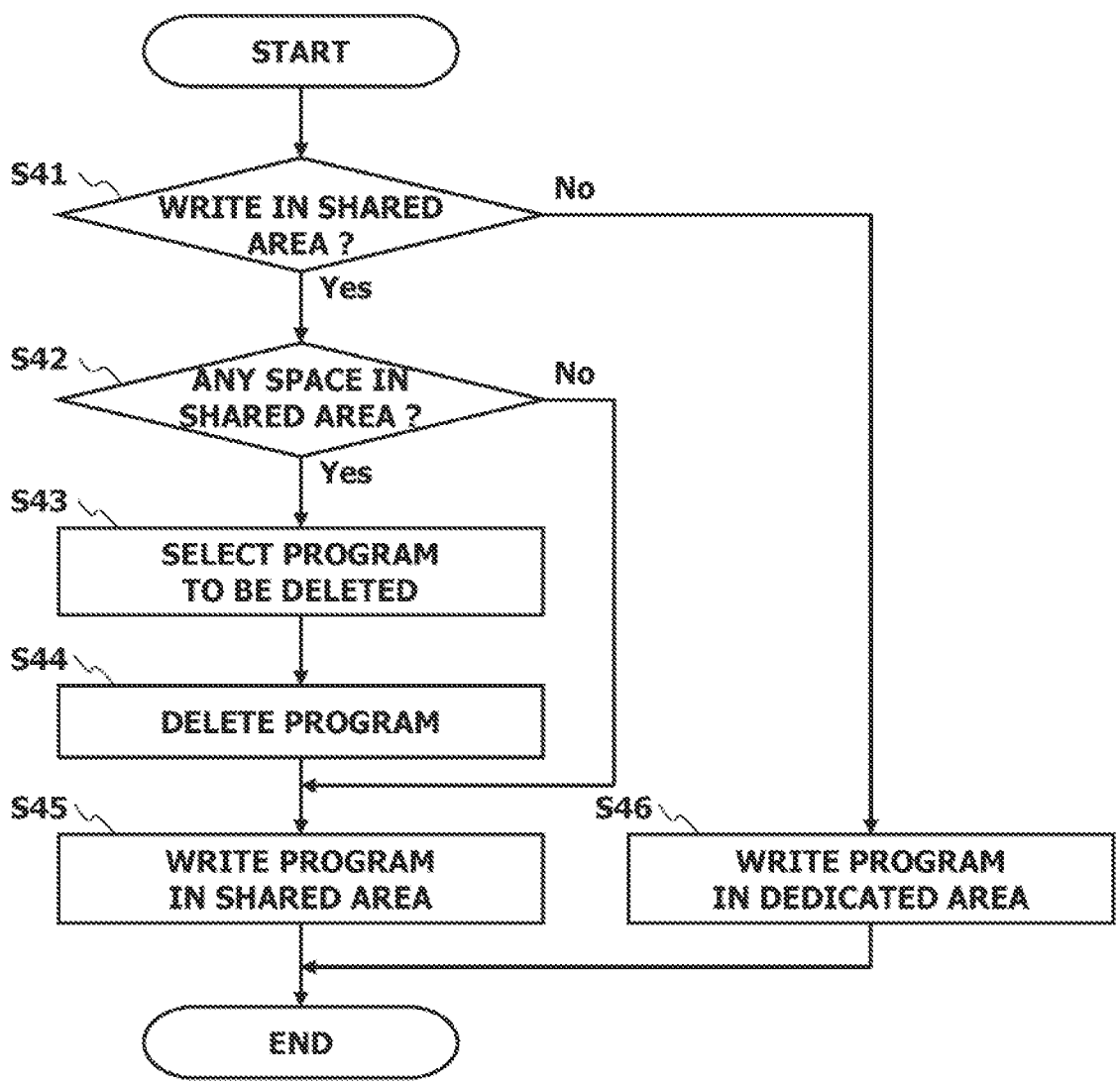
FIG. 12 is a flowchart of an example of program write processing.

FIG. 12 illustrates an example of program write processing which is executed by processor 120 of electronic control device 100 according to a write program written in code flash memory 140 when writing a program in the inactive ROM.

In Step 41, processor 120 of electronic control device 100 refers to a table that defines whether to write each program in a dedicated area or a shared area, for example, to determine whether to write a target program in the shared area. Here, the table is prepared considering the importance of a program, and stored in advance in code flash memory 140, for example. Then, if it is determined that the target program is to be written in the shared area (Yes), processor 120 of electronic control device 100 advances the processing to Step 42. If it is determined that the target program is not to be written in the shared area, that is, is to be written in the dedicated area because of high importance (No), processor 120 of electronic control device 100 advances the processing to Step 46.

In Step 42, processor 120 of electronic control device 100 refers to the bank B of code flash memory 140 to determine whether its shared area has any available space, that is, whether a target program can be written. Then, if it is determined that the shared area has no available space (Yes), processor 120 of electronic control device 100 advances the processing to Step 43. If it is determined that the shared area has available space (No), processor 120 of electronic control device 100 advances the processing to Step 45.

In Step 43, processor 120 of electronic control device 100 selects from programs written in the shared area of the bank B at least one program to be deleted, for example, a program with low importance, the earliest timestamp, or a similar size. Here, at least one program to be deleted can be selected according to a certain rule other than the above example.

In Step 44, processor 120 of electronic control device 100 deletes at least one program selected in Step 43 from the programs written in the shared area of the bank B. Consequently, the shared area of the bank B has space for storing the target program.

In Step 45, processor 120 of electronic control device 100 writes the target program in the shared area of the bank B. After that, processor 120 of electronic control device 100 ends the program write processing and proceeds with subsequent processing.

In Step 46, processor 120 of electronic control device 100 writes the target program in the dedicated area of the bank B. After that, processor 120 of electronic control device 100 ends the program write processing and proceeds with subsequent processing.

According to the above program write processing, a high-importance program is updated using a corresponding dedicated area, whereas a low-importance program is updated using a shared area that is shared with a plurality of programs. At this time, if the shared area has no space for storing the target program, at least one program is selected and deleted according to the program importance, for example. Then, the target program is written there. Consequently, a reserved area allocated in code flash memory 140 is reduced, and the storage area of code flash memory 140 can be efficiently used.

Now, how to use the shared area of the bank B for updating a program is described taking a specific example.

Figure 13:
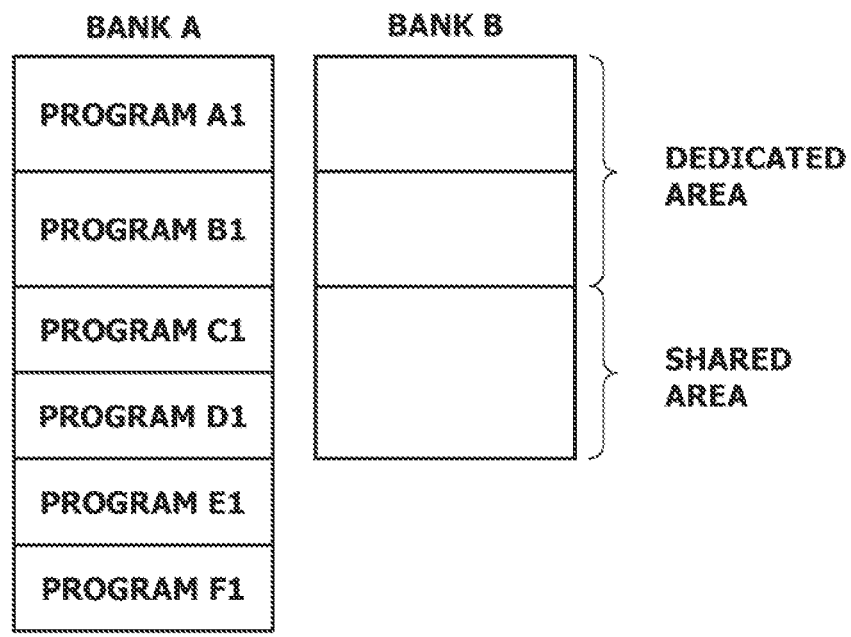
FIG. 13 illustrates the data structure of an initial storage area in which programs A1 to F1 are written.
Figure 14:
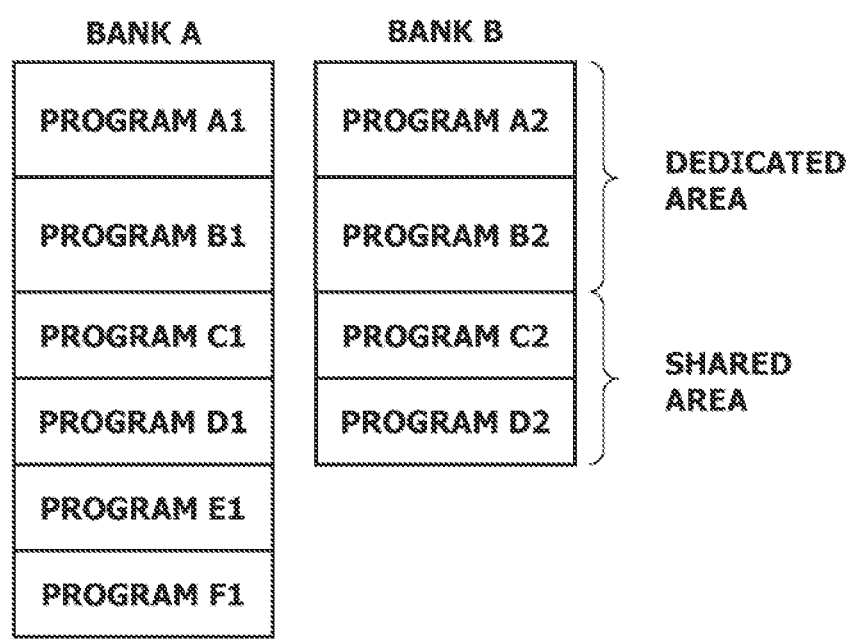
FIG. 14 illustrates the data structure of the storage area updated by writing programs A2 to D2.

As illustrated in FIG. 13, in the initial state of code flash memory 140, programs A1, B1, C1, D1, E1, and F1 are written in the bank A, and dedicated areas for the programs A and B and a shared area for programs C to F are allocated in the bank B. When the programs A2, B2, C2, and D2 are written for updating in response to an update request from the external device, as illustrated in FIG. 14, the programs A2 and B2 are written in the dedicated area of the bank B, and the programs C2 and D2 are written in the shared area of the bank B. In this state, the shared area of the bank B has no space, and thus, another program cannot be written therein for updating.

Figure 15:
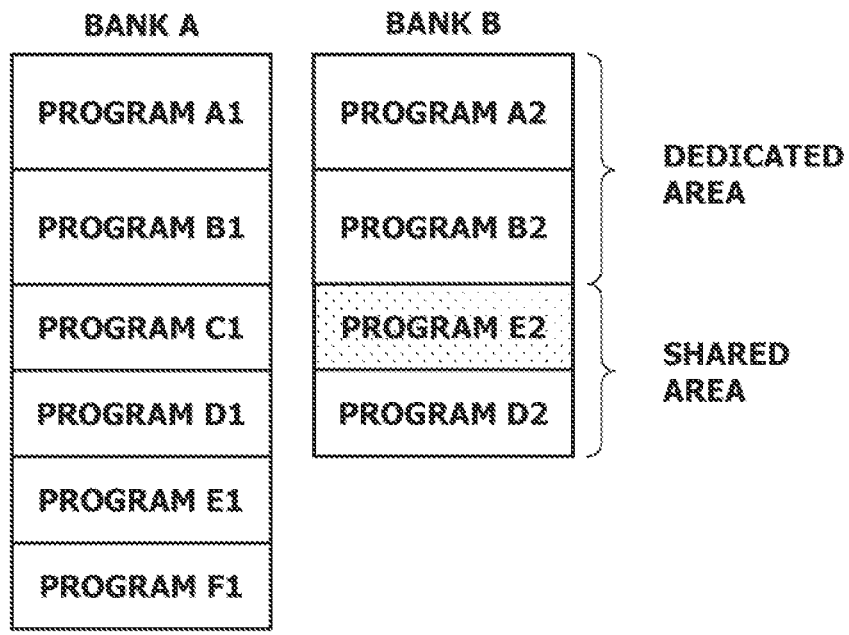
FIG. 15 illustrates the data structure of the storage area updated by writing a program E2.

Upon writing a program E2 for updating in response to an update request from the external device, the shared area of the bank B has no space, and thus, at least one of the programs C2 and D2 has to be deleted. To that end, as illustrated in FIG. 15, the program C2 with the earliest timestamp, for example, is deleted from the shared area of the bank B so that the program E2 is written for updating.

Figure 16:
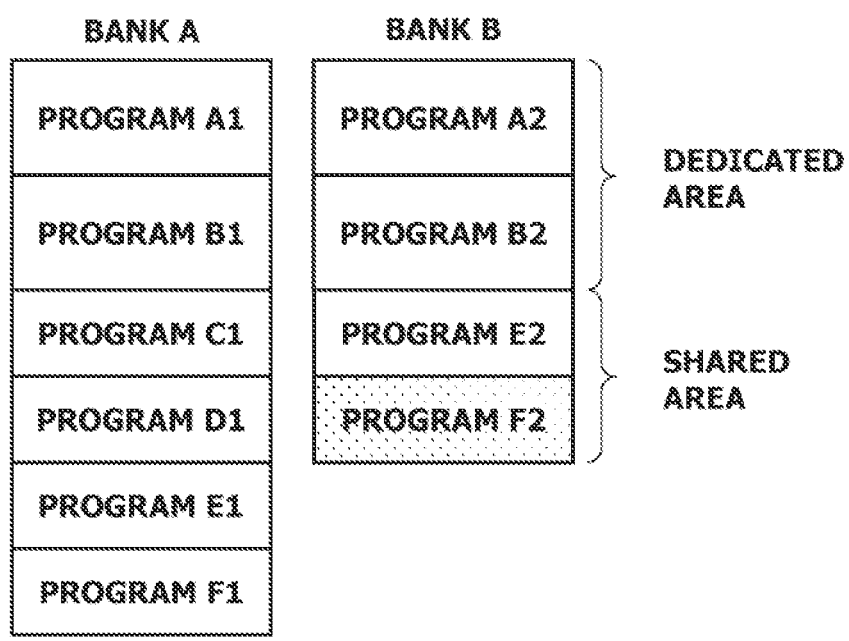
FIG. 16 illustrates the data structure of the storage area updated by writing a program F2.

After that, when writing a program F2 for updating in response to an update request from the external device, the shared area of the bank B has no space, and thus, at least one of the programs D2 and E2 has to be deleted. To that end, as illustrated in FIG. 16, the program D2 with the earliest timestamp, for example, is deleted from the shared area of the bank B so that the program F2 is written for updating.

Note that those skilled in the art will readily appreciate that various technical ideas of the above embodiments can be omitted, appropriately combined, or replaced in part to make another embodiment.

REFERENCE SYMBOL LIST

100 Electronic control device
120 Processor
140 Code flash memory (nonvolatile memory)

The invention claimed is:

1. An electronic control device comprising a nonvolatile memory having allocated two storage areas that are exclusively switchable between an active state and an inactive state, the two storage areas being set such that in a state in which a program is written in the storage area in the active state, a program is written for updating to the storage area in the inactive state in response to an instruction from an external device, followed by switching the storage area in the active state to the inactive state and switching the storage area in the inactive state to the active state, wherein
when the program written in the storage area in the active state differs from the program written in the storage area in the inactive state, the program written in the storage area switched to the active state is copied to the storage area in the inactive state, and
when the storage area in the inactive state is unused, arbitrary data is written in the storage area in the inactive state.

2. The electronic control device according to claim 1, wherein when a failure occurs in the program written in the storage area in the active state, the storage area in the active state is switched to the inactive state and the storage area in the inactive state is switched to the active state, to thereby continue control on a target component based on the program written in the storage area switched to the active state.

3. The electronic control device according to claim 2, wherein the storage area in the active state is switched to the inactive state and the storage area in the inactive state is switched to the active state in response to software reset.

4. The electronic control device according to claim 1, wherein when a failure occurs in the program written in the storage area in the active state, the program written in the storage area in the inactive state is copied for repair to the storage area in the active state.

5. The electronic control device according to claim 4, wherein the repair of the program is performed at boot time.

6. The electronic control device according to claim 1, wherein the storage area in the inactive state is divided into a dedicated area for at least one program selected from a plurality of programs based on a predetermined rule, and a shared area shared with at least one other program.

7. The electronic control device according to claim 6, wherein the predetermined rule is importance of a program.

8. The electronic control device according to claim 1, wherein the program to be written in the storage area in the inactive state is obtained through wireless communication.

9. A program-update method for an electronic control device including a nonvolatile memory having allocated two storage areas that are exclusively switchable between an active state and an inactive state, the two storage areas being set such that in a state in which a program is written in the storage area in the active state, a program is written for updating to the storage area in the inactive state in response to an instruction from an external device, followed by switching the storage area in the active state to the inactive state and switching the storage area in the inactive state to the active state, the program-update method comprising
when the program written in the storage area in the active state differs from the program written in the storage area in the inactive state, copying, by the electronic control device, the program written in the storage area switched to the active state to the storage area in the inactive state, and
when the storage area in the inactive state is unused, the electronic control device writes arbitrary data to the storage area in the inactive state.

10. The program-update method according to claim 9, wherein when a failure occurs in the program written in the storage area in the active state, the electronic control device switches the storage area in the active state to the inactive state and the storage area in the inactive state to the active state, to thereby continue control on a target component based on the program written in the storage area switched to the active state.

11. The program-update method according to claim 10, wherein the electronic control device switches the storage area in the active state to the inactive state and the storage area in the inactive state to the active state in response to software reset.

12. The program-update method according to claim 9, wherein when a failure occurs in the program written in the storage area in the active state, the electronic control device copies, for repair, the program written in the storage area in the inactive state to the storage area in the active state.

13. The program-update method according to claim 12, wherein the electronic control device performs the repair of the program at boot time.

14. The program-update method according to claim 9, wherein the storage area in the inactive state is divided into a dedicated area for at least one program selected from a plurality of programs based on a predetermined rule, and a shared area shared with at least one other program.

15. The program-update method according to claim 14, wherein the predetermined rule is importance of a program.

16. The program-update method according to claim 9, wherein the electronic control device obtains the program to be written in the storage area in the inactive state through wireless communication.

* * * * *